July 10, 1928.
F. E. SMALLIDGE
FRUIT CLEANING MACHINE
Filed Feb. 9, 1927
1,676,714
3 Sheets-Sheet 2
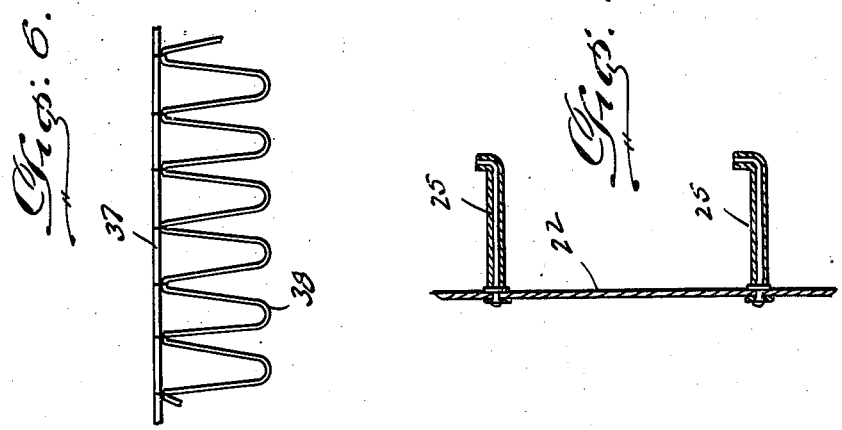
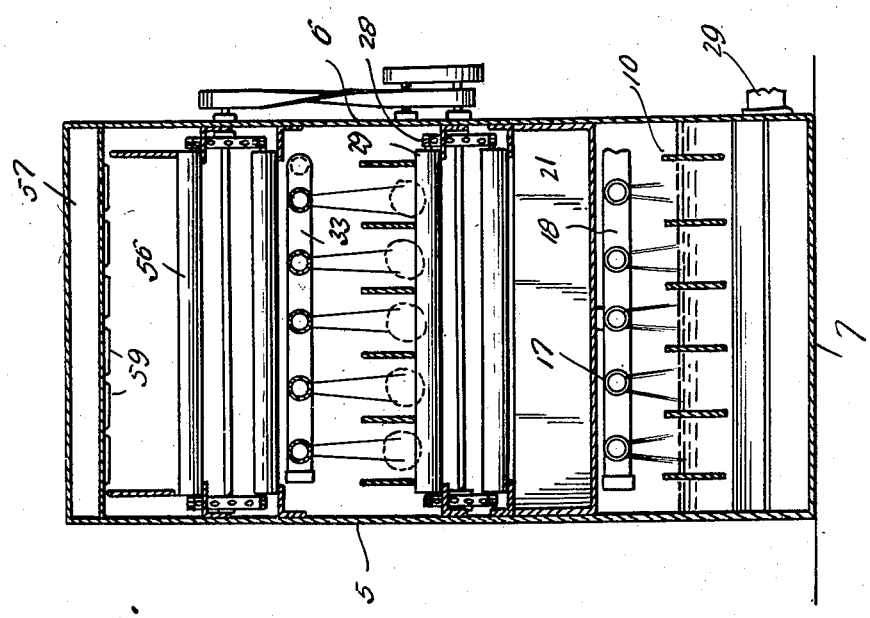
Inventor
F. E. Smallidge,
By Clarence A. O'Brien
Attorney

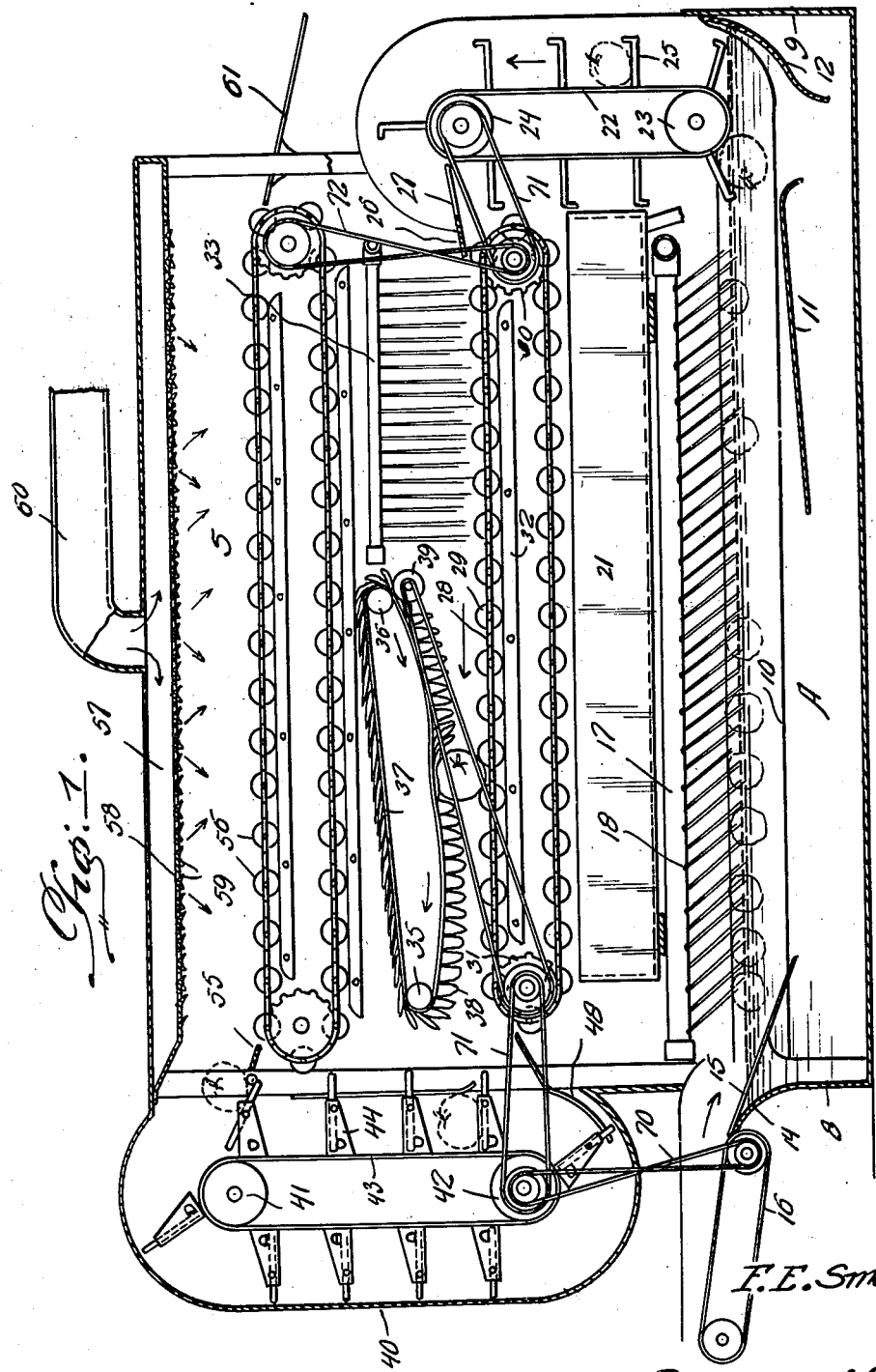

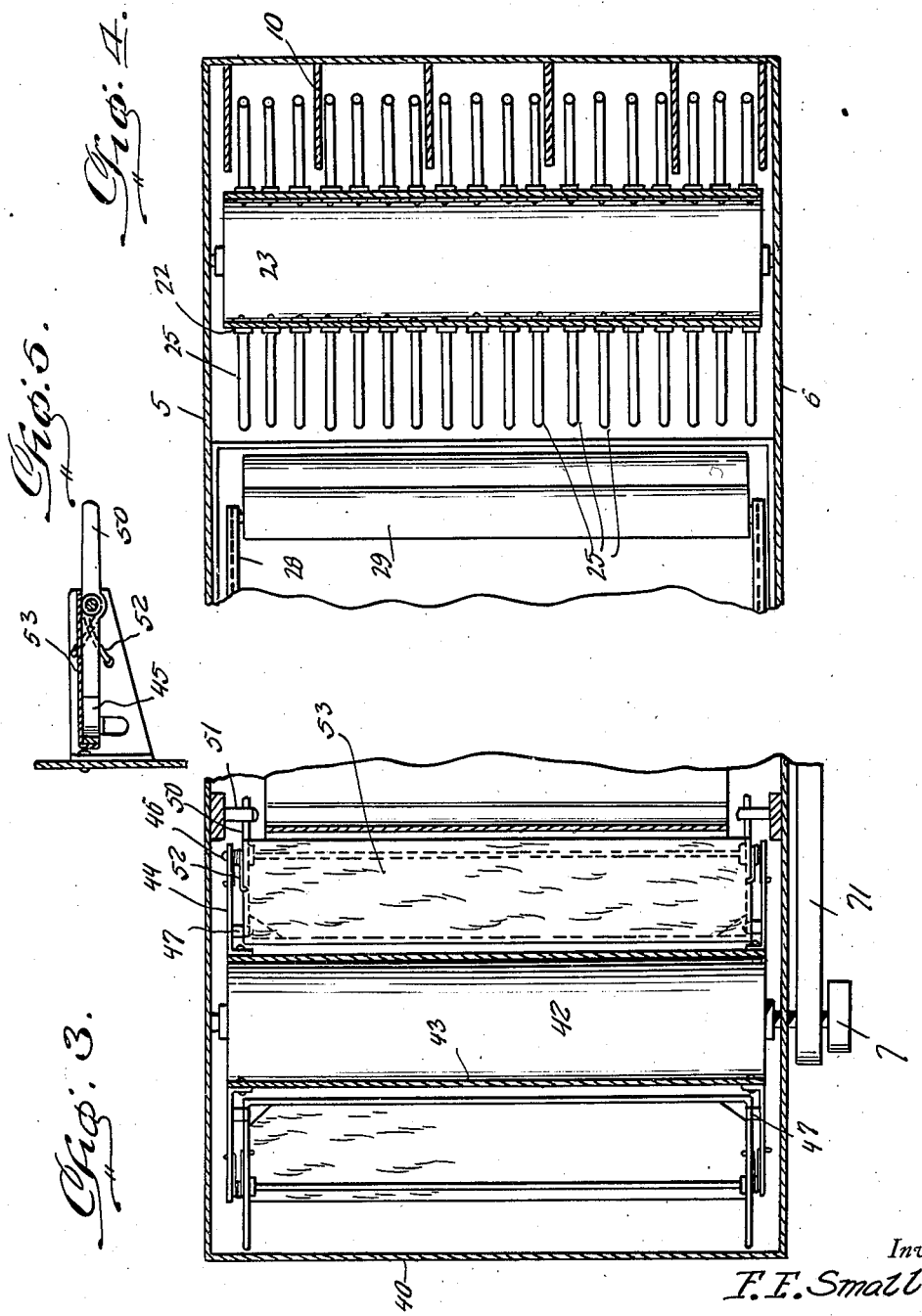

Patented July 10, 1928.

1,676,714

UNITED STATES PATENT OFFICE.

FRANK E. SMALLIDGE, OF WENATCHEE, WASHINGTON.

FRUIT-CLEANING MACHINE.

Application filed February 9, 1927. Serial No. 166,915.

The present invention appertains to new and useful improvements in machines for cleaning fruit, and has for its primary object the provision of a highly efficient and compact mechanism for use in subjecting fruit to be cleaned to a chemical bath and then carrying the same to a cleaning or rinsing jar and subsequently through the drying area so that within the time between the entrance of the fruit into the machine and into the discharge therefrom it is thoroughly washed and cleansed of any objectionable surface material and is dried sufficiently for immediate packing at the point of discharge.

The invention further aims to provide a machine of this character wherein rows of fruit may be fed into the machine at spaced intervals and wherein the fruit may be fed into the machine at spaced intervals and wherein the fruit will be properly separated during the chemical treatment and hoisting operation, and wherein there will be little or no liability of the fruit becoming wedged into the mechanism or even becoming bruised or otherwise damaged.

A still further very important object of the invention lies in the provision of a machine of this nature which is comparatively simple in its construction, thoroughly reliable in its operation, not likely to easily become out of order, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawing:—

Figure 1 is a vertical longitudinal section through the machine embodying the features of my invention, Fig. 2 is a vertical transverse section therethrough, Fig. 3 is a vertical sectional view through the elevating chamber, Fig. 4 is a vertical sectional view through another elevating chamber, Fig. 5 is an enlarged detail section through a portion of the first elevating mechanism, Fig. 6 is a detail of the wiping mechanism, Fig. 7 is an enlarged detail section through the second elevation.

Referring to the drawing in detail, it will be seen that the machine is embodied in a casing of any preferred construction which in the present instance comprises side walls 5 and 6 rising from a bottom 7 and end walls 8 and 9 which are much shorter than the side walls 5 and 6. The side walls 5 and 6 form with the end walls 8 and 9 a bath and chemical treating trough A approximately filled with the liquid chemical such as one half to one and one-half percent solution of hydrochloric acid for removing the arsenical spray residue from the fruit. A plurality of longitudinally extending partitions 10 are disposed in the trough A so that the fruit will progress therethrough in spaced parallel rows. Deflectors 11 are inclined upwardly and rearwardly and fall between the rear portions of the partitions 10. A deflector 12 is disposed adjacent the rear end walls 9. The front end wall 8 is curved outwardly as is indicated at 14. A guide platform 15 slants downwardly and inwardly from the curved extension 14 to receive the fruit from an endless conveyor 16 operated in any suitable manner for delivering the fruit into the machine. Spray pipes 17 are disposed above the rows formed by the partitions 10 and on their bottom surfaces are provided with jet openings 18 directing the jets of chemicals downwardly and rearwardly. The jets being directed in this manner tend to cause the fruit to flow from the front to the back, tending also to maintain them almost completely submerged and also tending to rotate the fruit so that they will be thoroughly treated by the chemical bath. The chemical liquid is fed to the pipe 17 in any suitable manner and of course, the spray from these pipes 17 maintains the level of the liquid in the trough A at a predetermined level and any suitable outlet may be provided such as is indicated at 20 in Figure 2 and this liquid may be pumped back in any suitable manner into the pipe 17. A drip tray 21 is mounted on the pipes 17.

An endless member 22 is trained over rolls 23 and 24 which are journaled in the sides 5 and 6 at the rear ends thereof and has a plurality of prongs 25 projecting therefrom in transverse rows as is indicated to advantage in Figure 4 so that these prongs pass in between the partitions and pick up the fruit to elevate it to a rinsing and wiping mechanism about to be described. These prongs 25 are covered as is illustrated in Fig. 7 to prevent injury of the fruit. A forwardly and downwardly inclined platform 26 between the sides 5 and 6 at their rear ends forwardly of the upper end of the elevating mechanism just described and at its rear edge has projecting teeth 27 which go between the prongs 25 so that the fruit will be taken off the prongs and will roll down the platform onto a horizontally disposed rolling and conveying mechanism. This horizontally disposed conveying and rolling mechanism comprises a pair of chains 28 having a plurality of rollers 29 journaled therebetween. The chains 28 are trained over sprockets 30 and 31. The upper run of the rollers 29 have their ends riding on tracks 32. It will thus be seen that when the fruit rolls down onto this conveying and rolling mechanism the rotation of the rollers causes their engagement with tracks 32 and will cause the fruit to roll over and over again and will be sprayed by spraying devices 33 for thoroughly rinsing the fruit. Rollers 35 and 36 are journaled between the sides 5 and 6 above the forward end of the conveying and rolling mechanism just described and has an endless member 37 trained thereover with a rubbing and absorbing plug or the like 38 stitched or otherwise fastened thereto in the form clearly illustrated in Fig. 6. A roller 39 is journaled between the sides 5 and 6 in close proximity to roller 36 and engages the endless member 37 with its cloth 38 so that when the roller 39 rotates the endless member 37 travels in the direction of the arrows in Figure 1, that is, the lower run of this endless member 37 moves in the same direction with the upper run of the rollers 29. The cloth 38 thoroughly wipes off all the moisture from the fruit and the moisture in the cloth is wrung out by rollers 36 and 39 as is clearly apparent from an inspection of Figure 1. An elevating housing 40 is disposed at the front end of the casing and has an upper roller 41 journaled therein and a lower roller 42 with an endless canvas or the like belt 43 trained thereover. A plurality of arms 44 project from the endless belt 43 and are arranged in pairs. In each pair there is disposed a frame 45 pivoted to the arms 44 as at 46 remote from the belt 43. Rests 37 engage the free ends of the frame to hold them in the positions so that they will receive the fruit from the conveyor and rolling mechanism by means of the forwardly and downwardly inclined platform 48 so that the fruit will be lifted and finally dumped by arms 50 engaging pins 51 at the upper end of the casing as will be apparent from an inspection of Figs. 1 and 3. These frames are normally held in the position shown by springs 52. Canvas or the like 53 is stretched across each of the frames 45. This elevator just described dumps the fruit onto a downwardly and rearwardly inclined platform 55 onto a rolling and conveying mechanism denoted generally by the numeral 56 and no detailed description thereof is necessary as this mechanism is identical with the previously described rolling and conveying mechanism. At the top of the casing there is formed a tank 57 the bottom wall of which is provided with a plurality of jets 58 leading to deflectors 59 which deflect air from the tank into lateral right and left directions alternately for thoroughly drying the fruit as it is turned over by the rollers of the mechanism 56. The pipe for leading the air to the tank 57 is denoted by numeral 60. A platform 61 leads from the rear end of the mechanism 56 so that the fruit may be caught into any sort of a receptacle.

From the above description it will be seen that this machine cleans, rinses, and dries the fruit very thoroughly and in a most efficient manner. The machine is exceedingly compact and occupies very little floor space considering the work done thereby. It is simple and easy to repair and to maintain in operation and is very economical with the chemical liquid used. It will be noted that there are two methods used for moving fruit through the chemical trough at the bottom of the casing. One is by the flowage of the liquid towards the grain and the other is the force of the liquid from the flaming jets. The jets cause the fruits to rotate, spin, and bob up and down as well as pass through the trough and are more important than the flowing, although the latter helps. In this machine the fruit is almost always partly out of the chemical so that the exposed surface gets the full effect of the force and cleaning ability of the liquid from the jets.

It is thought that the construction, operation, and advantages of this invention will be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

An inspection of Figure 1 will clearly illustrate one of the system of gearings or the like operating the various movable mechanisms. The same will be described by way of example. A belt with its run of cloth is indicated at 70 and is operated from the endless conveyor 60 and operates the elevator in the casing 40. An endless belt 71 operates the sprockets 31 from the roller 42. An endless belt 71 operates the roller 24 from the sprockets 30. An endless belt 72 has its runs crossed and operates one of the sprockets of the mechanism 56 from the sprocket 30.

Having thus described my invention, what I claim as new is:—

1. In a fruit washing machine, means for spraying and wiping fruit, means for passing air through the fruit, and an elevating mechanism between the two-mentioned means, said elevating mechanism comprising an endless belt, means for training the endless belt through a predetermined orbit, arms projecting from the endless belt and arranged in pairs, frames pivoted between the pairs of arms, canvas or the like across said frames, for maintaining the frames between the arms, means for tilting the frames to deliver the fruit from the elevator mechanism to the second mentioned means.

2. In a fruit washing machine of the character described, means for bathing fruit in a chemical solution, and a wiping mechanism, said wiping mechanism comprising an endless member, a pair of rollers over which said endless member is trained, a third roller in close proximity to one of the first-mentioned rollers for engaging the endless member to impart motion thereto, a cloth fixed at intervals to the endless member to pucker therefrom for wiping the fruit, the rollers in close proximity to each other functioning as wringers therefor.

In testimony whereof I affix my signature.

FRANK E. SMALLIDGE.